(12) United States Patent
Lunetta

(10) Patent No.: US 8,865,284 B2
(45) Date of Patent: Oct. 21, 2014

(54) FABRIC MOSAIC ELEMENT AND METHOD FOR MAKING THE SAME

(71) Applicant: Fortuny Inc., New York, NY (US)

(72) Inventor: Pietro Lunetta, Venice (IT)

(73) Assignee: Fortuny Inc., New York, NY (US)

( * ) Notice: Subject to any disclaimer, the term of this patent is extended or adjusted under 35 U.S.C. 154(b) by 132 days.

(21) Appl. No.: 13/644,598

(22) Filed: Oct. 4, 2012

(65) Prior Publication Data

US 2013/0089695 A1    Apr. 11, 2013

(30) Foreign Application Priority Data

Oct. 6, 2011    (IT) .............................. RM2011A0531

(51) Int. Cl.

| | |
|---|---|
| *B32B 3/14* | (2006.01) |
| *B32B 27/12* | (2006.01) |
| *B32B 27/40* | (2006.01) |
| *B32B 7/12* | (2006.01) |
| *B44F 11/04* | (2006.01) |
| *B44C 3/12* | (2006.01) |
| *B32B 38/00* | (2006.01) |
| *B32B 37/12* | (2006.01) |

(52) U.S. Cl.
CPC .............. *B44F 11/04* (2013.01); *B32B 38/0004* (2013.01); *B32B 27/12* (2013.01); *B32B 27/40* (2013.01); *B32B 3/14* (2013.01); *B32B 37/12* (2013.01); *B32B 7/12* (2013.01); *B32B 2607/02* (2013.01); *B32B 2305/18* (2013.01); *B44C 3/123* (2013.01)
USPC ............................................... 428/48; 428/47

(58) Field of Classification Search
CPC ........ B44C 3/123; B44C 3/14; B44C 38/004; B44C 27/12; B44C 27/40
USPC ....................................................... 428/48, 47
See application file for complete search history.

(56) References Cited

U.S. PATENT DOCUMENTS 4,546,024 A * 10/1985 Brown ............................ 428/44

* cited by examiner

*Primary Examiner* — Alexander Thomas
(74) *Attorney, Agent, or Firm* — Ladas & Parry, LLP

(57) ABSTRACT

Fabric mosaic element characterized in that it comprises a plurality of tesserae including, in a sequence and mutually bonded, a fabric, an anti-fraying material and a flexible layer constituted of a natural or man-made material, of a density ranging between 150 kg/m³ and 350 kg/m³, said tesserae being fixed to a of thermoplastic material layer in correspondence of the respective flexible layer.

12 Claims, 3 Drawing Sheets

FABRIC MOSAIC ELEMENT AND METHOD FOR MAKING THE SAME

CROSS-REFERENCE TO RELATED APPLICATIONS

Figure 1:
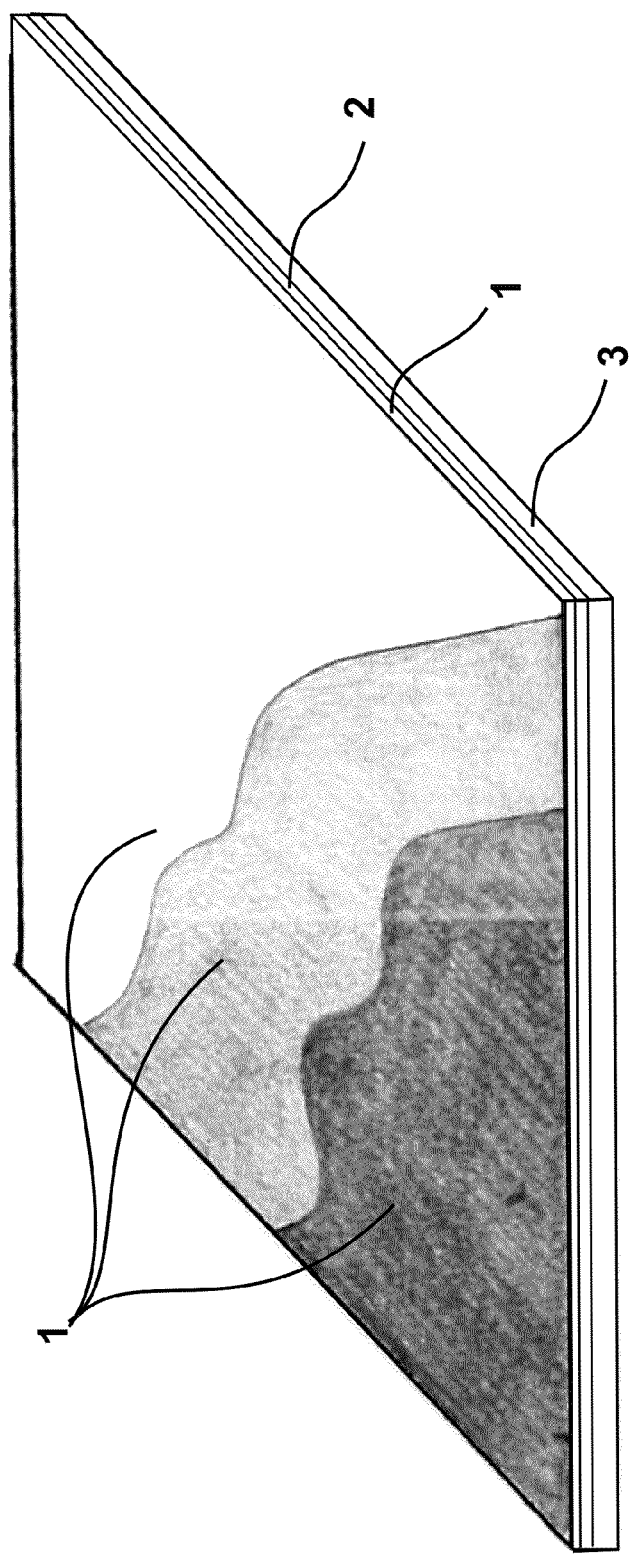

This application claims priority to Italian Patent Application No. RM2011A000531 filed on Oct. 6, 2011, the disclosure of which is hereby incorporated by reference in its entirety.

The present invention refers to a fabric mosaic element and method for making the same. Fabric mosaic elements obtained by this method are advantageously used in the decoration of household environments, such as a home's warmer and more convivial rooms, like living-rooms, dining rooms and bedrooms, or the rooms of public premises, such as hotels, restaurants or shops. More specifically, such mosaic elements are particularly suitable for use as lining of walls, columns or various kinds of masonry works, having a flat and/or curved surface.

There are known mosaic elements formed of tesserae made of rigid material, such as glass, marble or ceramic. Normally, such tesserae of rigid material are anchored to generally square or rectangular pieces of mesh the dimensions of which are of a few tens of centimeters. The tesserae anchored to each piece of mesh are usually arranged aligned each other and separate by joints of a width of 1 mm to 3 mm. The installation such mosaic elements requires the prior preparation of the concrete sub-base which has to be as more uniform, smooth, solid and free from cracks and fissures as possible in order to ensure the successful outcome of the work. After completing the preparation of the sub-base, the meshes with the tesserae can be put in place by using proper bonding agents. The installation is finally carried out by filling the joints between the tesserae by using filler or similar substances all over the lining surface and by subsequently cleaning the same in order to remove the excess of filler.

The installation of mosaic elements known from the prior art requires, therefore, some particular tricks, especially in the preparation of the sub-base intended for support of the meshes bearing the tesserae. The presence of roughness, cracks and/or fissures in the masonry sub-base would cause, in fact, an imperfect adhesion of mosaic elements to support structures.

Some additional problems may be found in the event that mosaic elements formed of rigid tesserae are used for lining complex surfaces, i.e. surfaces characterized by a plurality of sharp edges and/or rounded portions having particularly sharp curvature radius. In fact, in such cases, mosaic elements formed of rigid riles could imperfectly adhere to the sub-base prepared for their installation.

It is an object of the present invention to provide a fabric mosaic element and a method for making the same which overcome the disadvantages and drawbacks mentioned in connection with the prior art.

It is an additional object of the present invention to provide a fabric mosaic element particularly agreeable to sight and touch, inexpensive, easy to install and the structure of which allows the same to adhere to and to fit walls of any kind and shape.

It is an additional object of the present invention to provide a method for making an inexpensive and easy-to-install fabric mosaic element.

These objects are fully attained by a fabric mosaic element which is characterized in that it comprises a plurality of tesserae including, in a sequence and mutually bounded, a fabric, an anti-fray material and a flexible layer constituted of a natural or man-made material, of a density ranging between 150 kg/m$^3$ and 350 kg/m$^3$, said tesserae being fixed to a layer of thermoplastic material in correspondence of the respective flexible layer; and a method of making a fabric mosaic element which is characterized in that it comprises the phases of: providing a fabric; applying an anti-fray material to the fabric so as to prevent said fabric from fraying; applying a flexible layer to the anti-fray material; cutting the assembly constituted of the fabric, the anti-fray material and the flexible layer, in a direction substantially orthogonal with respect to the three latter components, so as to divide it into tesserae; arranging the tesserae according to a predetermined configuration and fixing them in position; applying a layer of thermoplastic material to the tesserae, on the flexible layer side, by means of a hot-melt adhesive substance; hot-pressing the assembly formed of the tesserae, of said hot-melt adhesive substance and of the layer of thermoplastic material in order to cause their mutual bonding.

The above fabric mosaic element and the method for making the same allow to obtain, in a simple and inexpensive manner, the lining of masonry surfaces of any shape, including particularly complex ones. Preferably, the flexible layer of the fabric mosaic element is constituted of felt which, due to its intrinsic characteristics, contributes to confer to the whole assembly excellent strength, solidity and flexibility.

According to another aspect of the present invention, the method for making the fabric mosaic element further comprises the phase of making the fabric undergo a waterproofing treatment, so as to obtain an element which is particularly resistant to water and to environmental damage.

According to another aspect of the present invention, the above method provides that hot-pressing is carried out at a working temperature between 100° C. and 120° C. and a working pressure between 2 bar and 5 bar; by this way, the perfect bonding of the various layers of materials constituting said element may be attained.

Figure 2:
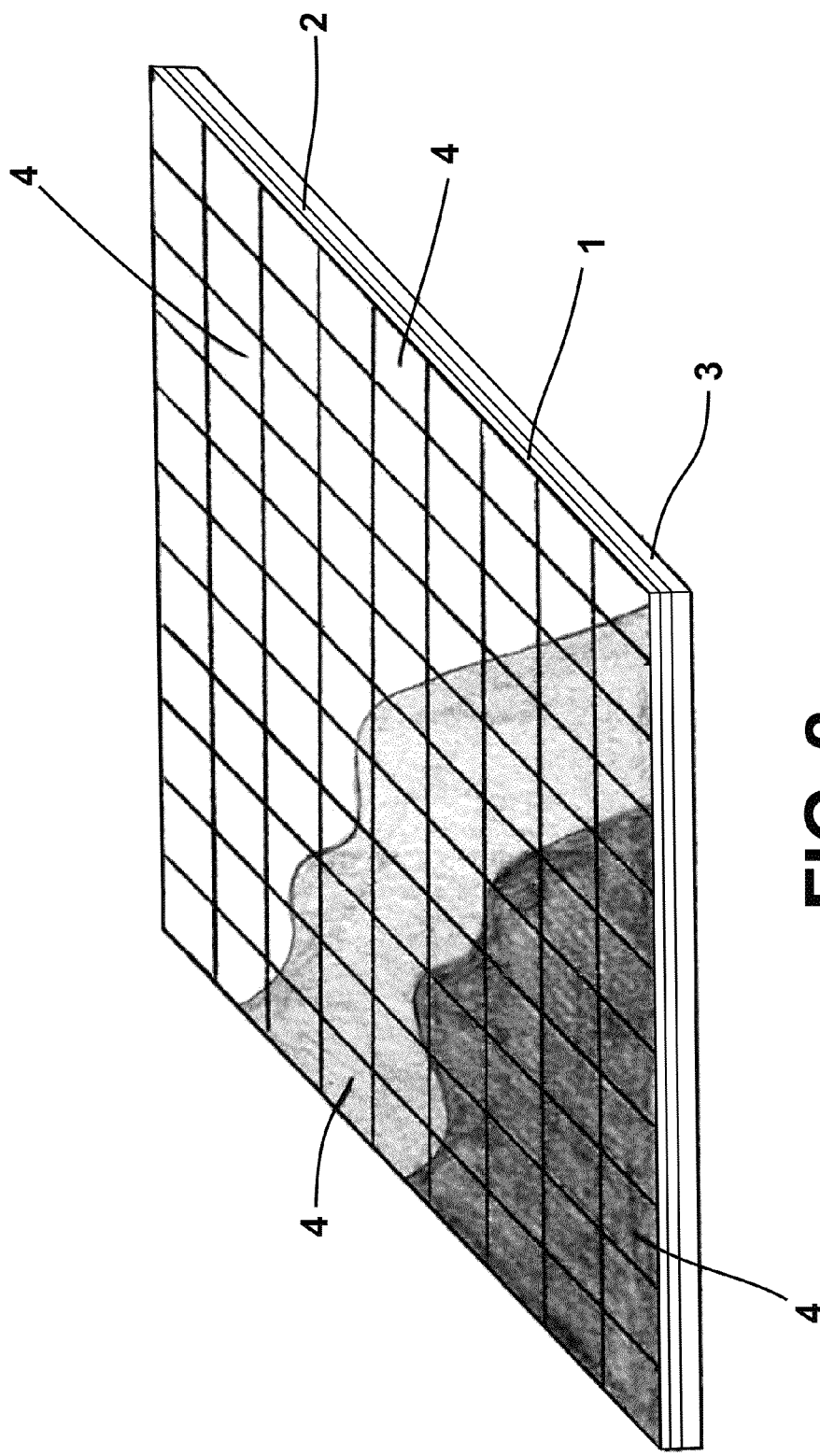
Figure 3:
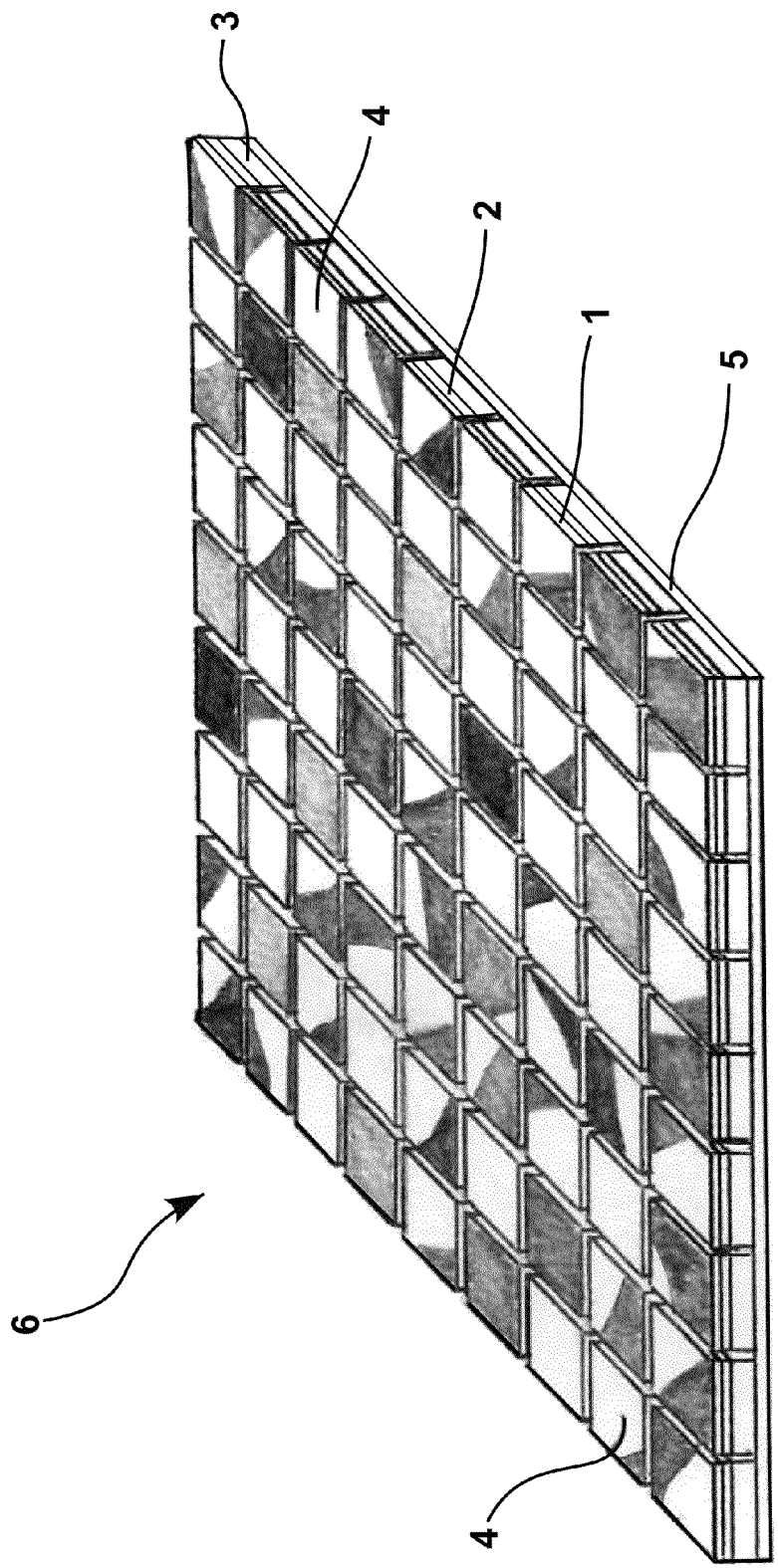

The characteristics and advantages of the present invention will be apparent from the following description of a preferred non-exclusive illustrated embodiment, which is provided by way of example and without limitation, with reference to annexed drawings in which:

FIGS. 1 and 2 are two schematic, non-scaled views of the semi-finished products obtained according to two different phases of the method for making a fabric mosaic element according to the present invention; and FIG. 3 is schematic, non-scaled view of a fabric mosaic element according to the present invention.

With reference to the annexed drawings, the method for making a fabric mosaic element according to the present invention provides for the use of a fabric 1 such as, by way of example, a printed artistic fabric or a spoiled fabric resulting from an industrial process.

Preferably, fabric 1 is made undergo a waterproofing treatment, by rolling or spraying, so as to make it water-resistant.

A hot-melt adhesive and thermoplastic anti-fray film 2, by way of example a polyurethane-based film is applied to fabric 1 in order to prevent fabric 1 from fraying during the subsequent operative phases of this method, and to favour its preservation over time.

As an alternative to said film 2, any substance preventing fabric 1 from fraying may be applied, by spraying or rolling, to fabric 1.

to A flexible layer 3, constituted of a natural or man-made material, of a density between 150 kg/m$^3$ and 350 Kg/m$^3$ is applied to film 2 or, in the alternative, to the above-mentioned substance having the same anti-fray function.

Preferably, but not exclusively, the flexible layer 3 is constituted of a felt layer having, preferably, a thickness of approximately 4 mm.

The assembly, constituted of the above three components superimposed and made integral with each other, i.e. fabric 1, the anti-fray film 2 or, in the alternative, the above-mentioned anti-fray substance and the flexible layer 3, is made undergo a cut operation along a direction substantially orthogonal to the extension of each of said components, which causes the assembly to be divided into tesserae 4 (see FIG. 2). Said cut operation may be accomplished, by way of example, by die cutting.

Each tesserae 4 has, preferably but not exclusively, the shape of a square with sides of approximately 20 mm each.

The tesserae 4, formed as described above, are placed in the spaces of a grid, by arranging the same as preferred so as to create the desired overall visual effect.

At this stage, a layer 5 of composite thermoplastic material (see FIG. 3) is applied to the tesserae (4), on the flexible layer 3 side, by means of hot-melt adhesive, preferably EVA-based, substance.

The bonding between tesserae 4 and the layer 5 of composite thermoplastic material is achieved by hot-pressing at a working temperature between 100° C. and 120° C. and a working pressure between 2 bar and 5 bar.

The layer 5 of composite thermoplastic material is, before application to tesserae 4, preferably engraved in order to weaken the same and reduce internal strains, so as to avoid any possible detachment of the fabric mosaic element after installation.

By using the method described above it is possible to obtain a fabric mosaic element 6 as shown in FIG. 3, preferably but not exclusively having dimensions of 314 mm×314 mm×5 mm and bearing 255 tesserae spaced by joints of a width of approximately 1 mm.

Preferably, a protective film is applied to tesserae 4 of the fabric mosaic element in order to preserve fabric 1 until completion of the installation process.

The installation of fabric mosaic elements may be easily carried out by bonding said elements to the masonry surface by using well-known bonding agent normally used in the construction industry and by possibly positioning fabric-coated rubber bands, by way of example made of EPDM or the same flexible material 3 in the joining areas between installed elements not lying in the same plane.

Installation is made even easier by the possibility of cutting fabric mosaic elements in situ by using a simple cutter or scissors, so as to make them fit the specific shape of the surface to be lined therewith.

Moreover, in comparison with mosaics formed of tesserae made of a rigid material, the element of the present invention allows to save on the quantities of bonding agent necessary for installation and to avoid both the phase of removal of the bonding agents from the joints after application of the element, and the final filling operation and subsequent cleaning of the tesserae.

In order to meet additional and contingent requirements, an expert in the field may make further changes to and improve the fabric mosaic element and the method for making the same, which are anyway all included in the scope of protection of this invention, as defined by the enclosed claims.

The invention claimed is:

1. A fabric mosaic element comprising a plurality of tesserae including, in a sequence and mutually bonded, a fabric, an anti-fraying material and a flexible layer constituted of a natural or man-made material, of a density ranging between 150 kg/m$^3$ and 350 kg/m$^3$, said tesserae being fixed to a thermoplastic material layer in contact with the flexible layer.

2. Element according to claim 1, wherein the flexible layer is made of felt.

3. Element according to claim 2, wherein the flexible layer, made of felt, has a thickness of approximately 4 mm.

4. Element according to claim 1, wherein the tesserae are spaced by spacings of a width of approximately 1 mm.

5. Element according to claim 1, wherein said anti-fraying material is polyurethane-based.

6. Element according to claim 1, wherein its strength allows cutting it by scissors or a cutter.

7. Element according to claim 1, wherein it comprises a removable protective film applied to the fabric of the tesserae.

8. Method for making a fabric mosaic element, wherein it comprises the steps of:
   providing a fabric;
   applying an anti-fraying material to the fabric to prevent said fabric from fraying;
   applying a flexible layer to the anti-fraying material;
   cutting the assembly formed of the fabric, the anti-fray material and the flexible layer, along a direction substantially orthogonal with respect to the three latter components, so as to divide it into tesserae;
   arranging the tesserae according to a predetermined configuration and fixing them in position;
   applying a thermoplastic material layer to the tesserae, on the flexible layer side, by means of hot-melt adhesive substance;
   hot-pressing the assembly formed of the tesserae, of said hot-melt adhesive substance and of the thermoplastic material layer in order to cause their mutual bonding.

9. Method according to claim 8, wherein further comprises the step of making the fabric undergo a waterproofing treatment, so as to make it water-resistant.

10. Method according to claim 8, wherein the hot-pressing step is carried out at a working temperature between 100° C. and 120° C. and a working pressure between 2 bar and 5 bar.

11. Method according to claim 8, wherein the thermoplastic material layer is carved in order to weaken the same and reduce internal strains.

12. Method according to claim 8, wherein the step of cutting the assembly formed of the fabric, of the anti-fraying material and of the flexible layer is accomplished by die cutting.

* * * * *